(12) United States Patent
Pearce

(10) Patent No.: US 6,797,765 B2
(45) Date of Patent: Sep. 28, 2004

(54) GELATINOUS ELASTOMER

(75) Inventor: Tony M. Pearce, Alpine, UT (US)

(73) Assignee: EdiZONE, LC, Alpine, UT (US)

( * ) Notice: Subject to any disclaimer, the term of this patent is extended or adjusted under 35 U.S.C. 154(b) by 0 days.

(21) Appl. No.: 09/952,035

(22) Filed: Sep. 11, 2001

(65) Prior Publication Data

US 2003/0092826 A1 May 15, 2003

Related U.S. Application Data

(63) Continuation-in-part of application No. 09/932,393, filed on Aug. 17, 2001, which is a continuation-in-part of application No. 09/303,979, filed on May 3, 1999, now Pat. No. 6,413,458, which is a continuation-in-part of application No. 08/968,750, filed on Aug. 13, 1997, now Pat. No. 6,026,527, which is a continuation-in-part of application No. 08/783,413, filed on Jan. 10, 1997, now Pat. No. 5,994,450, which is a continuation-in-part of application No. 08/601,374, filed on Feb. 14, 1996, now Pat. No. 5,749,111

(60) Provisional application No. 60/298,069, filed on Jun. 14, 2001, provisional application No. 60/267,124, filed on Feb. 8, 2001, provisional application No. 60/231,979, filed on Sep. 12, 2000, and provisional application No. 60/021,019, filed on Jul. 1, 1996.

(51) Int. Cl.$^7$ ............................................. C08L 53/00
(52) U.S. Cl. ...................... 524/505; 524/571; 524/575
(58) Field of Search ................................ 524/505, 571, 524/575

(56) References Cited

U.S. PATENT DOCUMENTS 3,827,999 A  *  8/1974  Crossland ................... 260/33.6
5,994,450 A  * 11/1999  Pearce ......................... 525/505

* cited by examiner

*Primary Examiner*—Peter D. Mulcahy
(74) *Attorney, Agent, or Firm*—Daniel P. McCarthy; Parsons Behle & Latimer

(57) ABSTRACT

An improved gelatinous elastomer is disclosed which uses an A-B-A triblock copolymer having a molecular weight in the range of 125,000 to 175,000, or about 150,000, and a plasticizer.

29 Claims, No Drawings

GELATINOUS ELASTOMER

CROSS REFERENCE TO RELATED APPLICATIONS

This patent application is a continuation-in-part patent application of Ser. No. 09/932,393 filed on Aug. 17, 2001, which is a continuation-in-part patent application of Ser. No. 09/303,979 filed on May 3, 1999, now U.S. Pat. No. 6,413,458, which is a continuation-in-part patent application of Ser. No. 08/968,750 filed on Aug. 13, 1997, now U.S. Pat. No. 6,026,527, which is a continuation-in-part patent application of Ser. No. 08/601,374 filed on Feb. 14, 1996, now U.S. Pat. No. 5,749,111 and which is a continuation in part of Ser. No. 08/783,413 filed on Jan. 10, 1997, now U.S. Pat. No. 5,994,450, which claims priority to U.S. provisional patent application serial No. 60/021,019 filed on Jul. 1, 1996, and priority is claimed to each of the foregoing.

Priority is also claimed to U.S. provisional patent application serial No. 60/231,979 filed on Sep. 12, 2000; U.S. provisional patent application serial No. 60/267,124 filed on Feb. 8, 2001; and U.S. provisional patent application serial No. 60/298,069 filed on Jun. 14, 2001.

BACKGROUND OF THE INVENTION

The present inventions apply to the field of soft elastomers, more particularly to gelatinous elastomers, and most particularly to the type of soft elastomer which is a plasticized block copolymer gel (hereafter "gel").

Gels are useful in many applications due to their properties that include high elongation, energy dampening, hydrostatic-like deformation, and elasticity. Applications of gels include but are not limited to cushioning, vibration dampening, shock absorption, toys, novelties, and friction enhancers.

There was considerable prior work in the gel field. For example, U.S. Pat. No. 5,994,450, which is hereby incorporated by reference, describes a gel made from ultra-high molecular weight SEEPS material, and provides references to a substantial number of prior art gel patents. The gel of this '450 patent remains the superior gel in the prior art insofar as elongation to failure, elasticity without permanent deformation, strength, and plasticizer retention.

Other prior art gels, which the inventor considers inferior due to their high tack, excessive oil bleed and low durability, have been patented in the name of John Y. Chen of Applied Elastomerics, Inc. Examples of such gels may be found in U.S. Pat. Nos. 6,161,555; 6,148,830; 6,117,176; 6,050,871; 6,033,283; 5,962,572; 5,938,499; 5,884,639; 5,868,597; 5,760,117; 5,655,947; 5,633,286; 5,624,294; 5,508,334; 5,475,890; 5,336,708; 5,334,222; 5,324,222; 5,262,468; 5,260,371; 5,239,723; 5,153,254; 4,618,213; and 4,369,284. U.S. Pat. No. 5,994,450 is believed to be the first to disclose a styrene etbylene-butylene ethylene-pronylene styrene gel, and U.S. Pat. No. 3,827,999 by inventor Ronald Crossland appears to be the first to disclose an SEBS gel. Another gel that is available is called "J-SOFT", a pelleted injection molding material offered by ATP, a division of Newgrange Company in Rhode Island.

SUMMARY OF INVENTION

It is an object of some embodiments of the invention to provide high-strength, low-bleed, low-tack gels. Further objects, features and advantages of the invention will become apparent to persons of ordinary skill in the art on reading this document.

DETAILED DESCRIPTION

As a general matter, gels may be fabricated using an A-B-A triblock copolymer plasticized with a plasticizing agent such as an oil. Some embodiments of the A-B-A triblock copolymer will have glassy end blocks and elastomer mid blocks. For example, SEEPS, SEBS, and SEPS are such polymers, and mineral oil is a suitable plasticizing agent. Additives may be included such as anti-oxidants, colorants, and microspheres to reduce weight and/or tackiness. It is expected that the ratio of oil to polymer in gels will usually be in the range of 1.0:1.0 to 8.5:1.0, although it could be outside of that range. In most gels of the invention, the ratio of oil to polymer will be 1.5:1.0 to 5.5:1.0.

The inventor has unexpectedly discovered that a particular tri-block copolymer combined with plasticizer makes a gel superior to any known prior art gel. Its chemical make-up does not fit the teachings of the prior gel art insofar as the chemical make-up required for a superior gel.

One embodiment of the invention uses a SEEPS triblock copolymer sold under the trade name SEPTON 4044, or a reasonable chemical equivalent thereof, combined with a plasticizer (and other useful additives) to create an elastomeric gel with superior properties to known prior art gels. Septon 4044 is available from Kuraray of Japan. It is a tri-block copolymer which has styrene groups as end blocks on the molecules and a rubber mid-block consisting of approximately a 50/50 ratio of ethylene butylene and ethylene propylene. The following examples illustrate the equality or superiority of the invented gel with prior Pearce and Chen gels. Pearce gel uses Septon 4055 (SEEPS), and Chen gel uses Kraton G1651 (SEBS), combined with plasticizers.

Septon 4044 has a molecular weight of about 150,000. In contrast, Septon 4055, which was the preferred triblock copolymer of the invention of U.S. Pat. No. 5,994,450, has a molecular weight of between 200,000 and 300,000, and Kraton G1651, which was the preferred embodiment of many of the prior art John Y. Chen patents has a molecular weight of about 210,000 to 240,000.

EXAMPLE 1

Samples were molded of gels that used a 3:1 ratio of A-B-A triblock copolymer and plasticizer in a 3:1 ratio of plasticizer to copolymer. The plasticizer was Duoprime 90 available from Lyondell Corporation of Lee's Summit, Mo. Duoprime 90 is a paraffinic mineral oil. Irganox 1010 from Ciba-Geigy Corporation of Tarrytown, N.Y. was added to each gel as an antioxidant in an amount equal to about 0.1% of the total weight of the gel. For the Chen gel listed below, Kraton G1651 available from Kraton Polymers of Houston, Tex. was the triblock copolymer. For the invented gel, referred to below as 4044 gel, Septon 4044 was used as the triblock copolymer.

The gels were molded under pressure in molds which produced a barbell-shaped sample approximately four inches long. The three-inch center section was a constant 0.25 inches in diameter.

Average results of tensile strength tests for the gels were as follows:

| Chen gel: | Tensile strength | 269 psi |
|---|---|---|
| | Elongation to failure | 1800% |
| 4044 gel: | Tensile strength | 310 psi |
| | Elongation to failure | 1600% |

This example shows that, very unexpectedly, the 4044 gel is stronger than the Chen gel. A review of Chen's patents shows a strident teaching that a gel made with a tri-block copolymer with the molecular weight of Septon 4044 should have a much lower tensile strength, for example ten times lower, than gels made with the higher molecular weight polymer such as his Kraton G1651. Thus the finding that gels made with lower molecular weight Septon 4044 are actually stronger than Chen's preferred gels is unexpected and astounding.

This example also shows that the elongation to failure of the gel of the instant invention was nearly as high as the Chen gel, whereas Chen's teaching is that a gel with lower molecular weight such as the instant invention should have a substantially lower elongation to failure, for example five times lower. Thus the high elongation to failure in the Septon 4044 gel is indeed unexpected.

EXAMPLE 2

Samples of gel cushion in a honeycomb shape were extruded as described in my U.S. Pat. No. 5,749,111 which is hereby incorporated by reference. The samples were three inches by three inches square and approximately 0.75 inches thick in the cushioning direction. The ratio of oil to polymer in the samples was 3:1 and about 0.1% by weight of antioxidant was used. The oil and antioxidant were as described in Example 1 above. The A-B-A triblock copolymer used for the Chen gel was Kraton G1651, for the Pearce gel was Septon 4055, and for the 4044 gel was Septon 4044.

The openings that formed the hollow columns of the honeycomb samples were approximately 0.25 inches by 0.25 inches. The samples were squeezed sideways with a pressure of 20 pounds on the three-inch side for five seconds. While this is not the intended cushioning direction, it is a good test for tackiness of the gel. The time required for all the cells to reopen after releasing the load is an indication of tackiness. Average results of tackiness tests are as follows:

| | |
|---|---|
| Chen gel: | 8.9 seconds to reopen all cells and return to original shape |
| Pearce gel: | 5.3 seconds to reopen all cells and return to original shape |
| 4044 gel: | 0.7 seconds to reopen all cells and return to original shape |

This example shows the gel of the instant invention, the 4044 gel, was far less tacky than the prior Chen and Pearce gels, notwithstanding that all ingredients of the gels were kept constant except for the A-B-A triblock copolymer.

EXAMPLE 3

Samples of Chen gel (Kraton G1651), Pearce gel (Septon 4055) and 4044 gel (Septon 4044) of the recipes listed above were molded under pressure in molds which produced a barbell-shaped sample approximately four inches long. The three-inch center section was a constant 0.25 inches in diameter. The ratio of oil to polymer was 3:1. The samples were pulled repeatedly to approximately 90% of their expected one-time failure elongation (see Example 1). The average number of cycles at which the sample failed are as follows:

| | |
|---|---|
| Chen gel: | 8 cycles to failure |
| Pearce gel: | 45 cycles to failure |
| 4044 gel: | Test discontinued at 100 cycles with no failure |

This test clearly shows the superiority of the instant invention in repeat tension loading capability, commonly referred to as fatigue resistance. This is an important factor in many product applications.

EXAMPLE 4

Discs of 0.20 inch diameter were produced using the Chen gel, Pearce gel and 4044 gel according to the recipes described above. The discs were placed on a wicking medium in the form of high-gloss paper in order to test oil bleed/wicking from the gel. Generally it is desired to have less oil bleed and oil wicking in a gel. Test results at various time intervals were as shown below. The number indicates the diameter of the oil stain in inches.

In testing the Chen gel for oil bleed, the bleed out was as follows:

One hour: 0.332
5 hours: 0.430
1 day: 0.612
3 days: 0.782
7 days: 0.881

In testing the Pearce gel for oil bleed, the bleed out was as follows:

One hour: 0.249
5 hours: 0.322
1 day: 0.452
3 days: 0.712
7 days: 0.750

In testing the 4044 gel for oil bleed, the bleed out was as follows:

One hour: 0.238
5 hours: 0.245
1 day: 0.436
3 days: 0.638
7 days: 0.677

Prior art Chen patents strongly teach that higher molecular weight is needed to reduce oil bleed out and wicking. But the invented 4044 gel, with the lower molecular weight of Septon 4044, is actually superior in oil wicking (less bleed), a most unexpected result.

EXAMPLE 5

Pearce gel, Chen gel, and the 4044 gel of my invention, at an oil:polymer ratio of 3:1, were processed through an extruder at 450 degrees F. The molten material was allowed to fall on a cookie sheet. The Pearce gel did not flow out as a fluid, but came out as a pile of worm-like material and remained that way during cooling. The Chen gel came out as worms, but the worms flowed together and made a cookie with a rough surface. The 4044 gel of my present invention came out as a liquid and flowed into a smooth, glossy cookie of larger diameter than the Chen cookie.

This example shows the superior processing characteristics of the 4044 gel. The instant invention is much easier to process in casting and pressure casting processes, and can be molded into much thinner parts in injection molding and extruding.

The difference between Septon 4055 and the Septon 4044 which is used in the instant invention is reported by the manufacturer Kuraray to be only molecular weight. Septon 4044 is lower average molecular weight, and substantially so. The average molecular weights of Septon 4055 (SEEPS) and Kraton G1651 (SEBS) are well over 200,000, while the weight average molecular weight of Septon 4044 (SEEPS) is in the neighborhood of only 150,000 on average, or within the general range of 125,000 to 175,000 typically. This significant difference is also exhibited in the solution viscosity when dissolved in toluene. The Septon 4044 has a much lower solution viscosity than either Septon 4055 or Kraton G1651. Septon 4044 has a solution viscosity of 50 to 150 cps, typically about 100 cps, @ 30 degrees C. when in a 7.5% solution in toluene (Brookfield Type Viscometer [BL]).

Chen patents also taught that a substantially higher molecular weight and a substantially higher solution viscosity than those of Septon 4044 are necessary to make an excellent gel. That is why my discovery was so unexpected. According to the teachings of Chen, a polymer with the molecular weight and solution viscosity of Septon 4044 should have produced a gel which had comparatively low elongation, high oil bleed, high oil wick-out, and low tensile strength. Perhaps this is why Septon 4044 is not even mentioned in the prior art documents the inventor has seen, because those skilled in the art would not consider Septon 4044 when attempting to make a superior gel. But, as shown by the examples above, the properties of 4044 gel are as good or better than the next best gel (4055 gel) and superior to the prior art G1651 (Chen) gel. The inventor does not at the time of this writing have a satisfactory technical explanation for the excellent properties of the invented gel, nor would he have predicted it, but instead he discovered it through experimentation.

While the physical properties of the invented gel are as good or better than the prior art, the processability, cost, and lack of tack make it the best gel yet. The invented gel, at its lower molecular weight and lower solution viscosity, has the advantages of being less tacky, lower cost, and more processable. But to have these wonderful features without losing the physical properties of elongation and strength and without experiencing plasticizer migration has never, before the instant invention, been available.

Processability: Septon 4055 and Kraton G1651 gels are very difficult to process because their melt viscosity at a given temperature is so high. In fact, in lower plasticizer ratios (for example, 2 parts white paraffinic mineral oil to 1 part Septon 4055), the gel materials are not castable at a temperature low enough to prevent material oxidation and degradation. With the invented gel using Septon 4044 is melt blended at a 3:1 ratio of plasticizer to Septon 4044 polymer, the material is pour-castable into a relatively complex heated mold at 375 degrees F., well below the short-term degradation temperature. Short term degradation temperature of the invented gel is believed to be about 475 to 500 degrees F. Short term degradation temperature is determined by an odor indicating burning or oxidation after the gel is cooled to room temperature, or alternatively by 5% or more of the A-B-A molecules having the B chain broken, turning the A-B-A molecule (a tri-block) into two A-B molecules (a di-block) as measured by industry standard tests. The processability is also improved in other processes than casting, such as extrusion, rotational molding, and injection molding.

Lower cost: First, the A-B-A triblock copolymer of Septon 4044 is less expensive than Septon 4055 or Kraton G1651 because lower molecular weight materials are generally less expensive to produce. Next, a particular desired durometer gel material can be achieved with less polymer (more plasticizer) using Septon 4044 . Since the plasticizer (for example, white paraffinic mineral oil) is usually much less expensive than the tri-block polymer, the price per unit weight is much less for a given durometer with Septon 4044 gel than with Septon 4055 and Kraton G1651 gels.

Lower tack: Tack is an undesirable feature in many if not most gel applications. Gel made using Septon 4044 is much less tacky at a given polymer-to-oil ratio than 4055 or G1651 gels. It is enough less tacky that it is anticipated to open up many product uses that heretofore were not feasible due to high tackiness, for example, doll skins.

Not all material properties are improved by using Septon 4044 gels over Septon 4055 gels or Chen gels. The gel of the instant invention is more prone to shape deformation at elevated temperatures, and is more prone to permanent set with prolonged deformations at room temperature. However, these properties do not apply to many products, and so for the products to which they do not apply, the gel of the instant invention is superior. For example, in cushioning products which receive intermittent loadings and are not heated to temperatures above 150 degrees F. (such as backpack straps or golf bag straps), the gels of the instant invention work very well. In some embodiments of the instant invention, a gel may be made which includes Septon 4044 in combination with Septon 4055 and/or Kraton G1651 (or other such high molecular weight thermoplastic elastomers), so that in the event the temperature resistance or permanent set need to be improved, the addition of such polymers can improve those properties.

The gel of the instant invention is made by melt blending Septon 4044 or a reasonable chemical equivalent with a plasticizer. Appropriate manufacturing methods are disclosed in U.S. Pat. No. 5,994,450 which is hereby incorporated by reference. A preferred plasticizer which may be used in the instant invention is Duoprime 90 from Lyondell Corporation of Lee's Summit, Mo. a white paraffinic mineral oil. Other oils are also useful as plasticizers in compounding the material of the present invention. Examples of representative commercially available oils include processing oils such as paraffinic and napthenic petroleum oils, highly refined aromatic-free or low aromaticity paraffinic and napthenic food and technical grade white petroleum mineral oils, and synthetic liquid oligomers of polybutene, polypropene, polyterpene, etc., and others. The synthetic series process oils are oligomers which are permanently fluid liquid non-olefins, isoparaffins or paraffins. Many such oils are known and commercially available. Examples of representative commercially available oils include Amoco polybutenes, hydrogenated polybutenes and polybutenes with epoxide functionality at one end of the polybutene polymer. Examples of such Amoco polybutenes include: L-14 (320 Mn), L-50 (420 Mn), L-100 (460 Mn), H-15 (560 Mn), H-25 (610 Mn), H-35 (660 Mn), H-50 (750 Mn), H-100 (920 Mn), H-300 (1290 Mn), L-14E (27–37 cst @ 100.degree. F. Viscosity), L-300E (635–690 cst @ 210.degree. F. Viscosity), Actipol E6 (365 Mn), E16 (973 Mn), E23 (1433 Mn) and the like. Examples of various commercially available oils include: Bayol, Bemol, American, Blandol, Drakeol, Ervol, Gloria, Kaydol, Litetek, Marcol, Parol, Peneteck, Primol, Protol, Sontex, and the like.

The invention includes gel formulations from a 1:1 ratio or lower of oil to elastomer to 8:1 and higher.

It is also part of my invention to combine beneficial additives with the invented gel, including but not limited to, antioxidants, bleed/wicking reducers, flame retardants, melt viscosity changers, particulate matter, and pigments/dies. Of particular note is the addition of microspheres including those made of plastic or glass (hollow for weight reduction or filled with phase change material or etc.).

A preferred triblock copolymer of the invention is of the general configuration A-B-A, wherein A is selected from the group consisting of monoalkenylarene polymers; wherein B is a hydrogenated polymer including a plurality of isoprene monomers and a plurality of butadiene monomers; wherein said isoprene monomers comprise at least about 30 weight percent of said hydrogenated polymer B; wherein said butadiene monomer comprise at least about 30 weight percent of said hydrogenated polymer B; wherein solution viscosity of the triblock copolymer is about 100 cps @ 30 degrees C. when in a 7.5% solution in toluene; wherein said plasticizer associates with said hydrogenated polymer B; wherein said triblock copolymer has a measurable percent elongation at break; wherein said plasticizer tends to increase the percent elongation at break of said triblock copolymer; wherein said triblock copolymer has a rigidity measurable on the Gram Bloom scale; and wherein said plasticizer tends to decrease the Gram Bloom rigidity of said triblock copolymer. "A" may also be a hygrogenated polymer including ethylene/propylene and ethylene/butylene; and the combined weights of said ethylene/propylene and said ethylene/butylene comprise more than about 50 weight percent of the hydrogenated polymer B. The A end blocks may be described as glassy styrene structures. In some cases, the mid block B of at least some of said triblock copolymers includes a plurality of backbone carbon molecules and a plurality of side chains. B may be a hydrogenated polymer that has a plurality of covalently linked conjugated diene monomers, at least one of said conjugated diene monomers being isoprene. End blocks A may be a polymer having functionalized styrene monomers.

Some plasticizers of the invention include a plurality of components; including a hydrocarbon resin; and including at least one of said components is selected from the group consisting of naturally derived oils, synthetic oils, and liquid oligomers. The plasticizer should associate with hydrogenated polymer B to increase elasticity and decrease the Gram Bloom rigidity of said triblock copolymer. Hollow spherical objects such as microspheres may be included in the gel. The plasticizer, upon placement of the material under a load, tend to facilitate disentanglement and elongation of mid blocks B during elongation of the gel material; and the plasticizing polymer molecules, upon release of the load from the material, tend to facilitate recontraction of the material. The plasticizer should be compatible with the B block of the triblock copolymer. In some embodiments, the gelatinous elastomeric material will have a durometer of about 15 Shore A or lower.

While the present invention has been described and illustrated in conjunction with a number of specific embodiments, those skilled in the art will appreciate that variations and modifications may be made without departing from the principles of the invention as herein illustrated, as described and claimed. The present invention may be embodied in other specific forms without departing from its spirit or essential characteristics. The described embodiments are considered in all respects to be illustrative and not restrictive. The scope of the invention is, therefore, indicated by the appended claims, rather than by the foregoing description. All changes which come within the meaning and range of equivalence of the claims are to be embraced within their scope.

What is claimed is:

1. An elastomeric material comprising:
    a plasticizer selected from the group consisting of oils and polybutenes, and
    a SEEPS triblock copolymer of the general configuration A-B-A;
    wherein the plasticizer and copolymer are mixed to form a gel;
    wherein A is selected from the group consisting of monoalkenylarene polymers;
    wherein B is a hydrogenated polymer including a plurality of hydrogenated isoprene monomers and a plurality of hydrogenated butadiene monomers;
    wherein said SEEPS triblock copolymer has a weight average molecular weight of about 125,000 to 175,000
    wherein said SEEPS triblock copolymer has a solution viscosity of about 50 to about 150 cps @ 30 degrees C. when in a 7.5% solution in toluene;
    wherein said plasticizer associates with said hydrogenated polymer B;
    wherein said SEEPS triblock copolymer has a measurable percent elongation at break;
    wherein said plasticizer tends to increase the percent elongation at break of said SEEPS triblock copolymer;
    wherein said SEEPS triblock copolymer has a rigidity measurable on the Gram Bloom scale; and
    wherein said plasticizer tends to decrease the Gram Bloom rigidity of said SEEPS triblock copolymer.

2. A material as recited in claim 1, wherein said gel has a ratio of oil to elastomer from about 1:1 to about 8:1.

3. A material as recited in claim 1, wherein the material can be readily pour-cast at about 375 degrees F. when melt blended in a 3:1 ratio of said plasticizer to said SEEPS triblock copolymer.

4. An elastomeric material as recited in claim 1, wherein said plasticizer comprises a plurality of components;
    wherein at least one of said components is a hydrocarbon resin; and
    wherein at least one of said components is selected from the group consisting of naturally derived oils, synthetic oils, and liquid oligomers.

5. An elastomeric material as recited in claim 1, wherein said solution viscosity is about 95 to 115 cps.

6. An elastomeric material comprising:
    a plasticizer and
    a SEEPS triblock copolymer of the general configuration A-B-A and having a weight average molecular weight of from about 125,000 to 175,000;
    wherein A is a non-elastomeric polymer and B is a hydrogenated polymer selected from the group consisting of ethylene/propylene, ethylene/butylene, and a combination thereof;
    wherein the combined weights of said ethylene/propylene and said ethylene/butylene comprise more than about 50 weight percent of said hydrogenated polymer B;
    wherein said plasticizer associates with said hydrogenated polymer B;
    wherein said SEEPS triblock copolymer has a measurable percent elongation at break;
    wherein said plasticizer tends to increase the percent elongation at break of said SEEPS triblock copolymer;
    wherein said SEEPS triblock copolymer has a rigidity measurable on the Gram Bloom scale; and
    wherein said plasticizer tends to decrease the Gram Bloom rigidity of said SEEPS triblock copolymer.

7. A material as recited in claim 6 wherein said plasticizer and said copolymer are mixed to form a gelatinous thermoplastic elastomer.

8. A material as recited in claim 7 wherein said gel has an oil to copolymer ratio of from about 1:1 to about 8:1.

9. A material as recited in claim 7 wherein the material can be readily pour-cast at about 375 degrees F. when melt blended in a 3:1 ratio of said plasticizer to said SEEPS triblock copolymer.

10. A material as recited in claim 6 wherein said copolymer has a weight average molecular weight of about 150,000.

11. A material as recited in claim 6 wherein said plasticizer includes a polymer.

12. A material as recited in claim 7 further comprising a quantity of spherical objects.

13. A material as recited in claim 12 wherein said spherical objects are microspheres.

14. A material as recited in claim 6
wherein each of said mid block B is covalently linked to both of said end blocks A;
wherein said end blocks A are non-elastomeric polymers;
wherein said mid block B is an elastomeric polymer.

15. A material as recited in claim 6 further comprising an antioxidant.

16. A material as recited in claim 6,
wherein A is a polymer selected from the group consisting of monoalkenylarene polymers;
wherein B is a hydrogenated polymer comprising a plurality of covalently linked conjugated diene monomers; and
wherein at least one of said conjugated diene monomers is isoprene and at least one of said conjugated diene monomers is butadiene.

17. A material as recited in claim 16 wherein said plasticizer and said copolymer are mixed to form a gelatinous thermoplastic elastomer.

18. A material as recited in claim 17 wherein said gel has an oil to copolymer ratio of from about 1:1 to about 8:1.

19. A material as recited in claim 17 wherein the material can be readily pour-cast at about 375 degrees F. when melt blended in a 3:1 ratio of said plasticizer to said SEEPS triblock copolymer.

20. A material as recited in claim 16 wherein said copolymer has a weight average molecular weight of about 150,000.

21. A material as recited in claim 16 wherein said plasticizer includes a polymer.

22. A material as recited in claim 17 further comprising a quantity of spherical objects.

23. A material as recited in claim 22 wherein said spherical objects are microspheres.

24. A material as recited in claim 16
wherein each of said mid block B is covalently linked to both of said end blocks A;
wherein said end blocks A are non-elastomeric polymers;
wherein said mid block B is an elastomeric polymer.

25. A material as recited in claim 16 further comprising an antioxidant.

26. A material as recited in claim 16, wherein the material has a durometer of about 15 Shore A or lower.

27. An elastomeric material comprising:
a SEEPS triblock copolymer elastomer of the configuration A-B-A and having a weight average molecular weight of from about 125,000 to 175,000, block A being a non-elastomeric polymer and block B being an elastomeric polymer, and
a plasticizer combined with said SEEPS triblock copolymer elastomer to form a visco-elastic material, said plasticizer being compatible with said B block.

28. A material as recited in claim 27 wherein said plasticizer and said elastomer are found in the material in a ratio of from about 1:1 to about 8:1.

29. A material as recited in claim 27, wherein the material has a short term degradation temperature of at least about 375 degrees F.; and wherein said copolymer has a solution viscosity of about 104 cps @ 30 degrees C. when in a 7.5% solution in toluene.

* * * * *